(12) United States Patent
Larson

(10) Patent No.: US 6,571,244 B1
(45) Date of Patent: May 27, 2003

(54) RUN FORMATION IN LARGE SCALE SORTING USING BATCHED REPLACEMENT SELECTION

(75) Inventor: Per-Ake Larson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/437,714

(22) Filed: Oct. 28, 1999

(51) Int. Cl.$^7$ .................................................. G06F 7/00
(52) U.S. Cl. ........................ 707/7; 707/100; 707/103 R; 707/103 Y
(58) Field of Search ...................... 707/7, 100, 103 R, 707/103 Y

(56) References Cited

U.S. PATENT DOCUMENTS 5,287,494 A * 2/1994 Garcia et al. .................... 707/7
5,852,826 A * 12/1998 Graunke et al. ................. 707/7

OTHER PUBLICATIONS

Dinsmore, "Longer Strings from Sorting," Communications of the ACM, vol. 8, No. 1, Jan. 1965, p. 48.
Frazer et al., "Sorting by Natural Selection," Communications of the ACM, vol. 15, No. 10, Oct. 1972, pp. 910–913.
LaMarca et al., "The Influence of Caches on the Performance of Sorting," Proceedings of the Eighth Annual ACM–SIAM Symposium on Discrete Algorithms, Jan. 1997, pp. 370–379.
Larson et al., "Memory Management during Run Generation in External Sorting", ACM, 1998, pp. 472–483.
Nyberg et al., "AlphaSort: A RISC Machine Sort", SIGMOD 1994, pp. 233–242.
Ting et al., "Multiway replacement selection sort with dynamic reservoir," The Computer Journal, vol. 20, No. 4, Aug. 1977, pp. 298–301.
Knuth, "The Art of Computer Programming: vol. 3, Sorting and Searching," Second Edition, Addison Wesley publishers, 1998, pp. i–xiii and 1–780.

* cited by examiner

Primary Examiner—Kim Vu
Assistant Examiner—Hung Pham
(74) Attorney, Agent, or Firm—Lee & Hayes, PLLC

(57) ABSTRACT

A large-scale sorting process utilizes a batched replacement selection method to form runs of sorted data records. The batched replacement selection method involves reading multiple records from a persistent data storage into main memory and sorting the multiple records to form a mini-run of multiple sorted data records. After formation, the mini-run is added to a selection tree by inserting a pointer to a first record in the mini-run into the array of pointers. The first record is linked to remaining records in the mini-run. As records are selected for output from the selection tree, the methodology replaces the selected record with a next record in the associated mini-run (if not empty) or alternatively deletes the node if the mini-run is empty. The selected records are collected into an output buffer. When the number of records reaches a pre-determined number, the selected records are written in batch back to the persistent data storage.

44 Claims, 12 Drawing Sheets

RUN FORMATION IN LARGE SCALE SORTING USING BATCHED REPLACEMENT SELECTION

TECHNICAL FIELD

This invention relates to systems and methods for large scale sorting of data records. More particularly, this invention relates to run formation techniques for producing sorted subsets or "runs" of data records that will be subsequently merged together to produce the final sorted set of data records.

BACKGROUND

Database systems store data records on disk arrays or other forms of non-volatile memory. Operations performed on databases can be easily accommodated if all of the data records are first loaded into volatile main memory (i.e., RAM) for processing. However, databases often contain large numbers of data records, which far surpass the volatile memory resources. As a result, subsets of data records are processed in the main memory and then written back to disk after they are processed.

Large scale sorting is one type of operation performed by a database system on a large set of data records that is too large to fit in main memory. "Mergesort" is the standard technique used for sorting large sets of records. Mergesort has two phases: (1) a run formation phase that creates sorted subsets, called "runs", and (2) a merge phase that repeatedly merges runs into larger and larger runs, until a single run has been created. This invention pertains to the run formation phase of a mergesort operation.

In general, there are two types of run formation techniques: load-sort-store and replacement selection. Most sort implementations use the load-sort-store algorithm for run formation. This invention is directed to an improved replacement selection technique. Load-sort-store is briefly described below, followed by a more detailed look at replacement selection.

Run Formation Type I: Load-Sort-Store

FIG. 1 shows the load-sort-store process implemented on a database system 20 having main memory 22 and persistent data storage 24. As the name implies, the load-sort-store process has three main steps: loading, sorting, and storing. During a "load" step 1, a subset of records is read from the data storage 24 into the main memory 22. Next, during a "sort" step 2, the process extracts pointers to all records into an array and sorts the entries in the array according to a designated sort key to form the run. Any in-memory sorting algorithm can be used, with "Quicksort" being the most popular choice. Afterwards, during a "store" step 3, the run is written back to the data storage 24 and all records in main memory 22 are erased.

These three steps are repeated until all records have been processed. All runs created will be of the same length, except possibly the last run. After multiple runs have been created and stored during the run formation phase, the sorting process transitions to the merge phase in which the runs are merged into one large run.

One drawback with the load-sort-store process is that CPU processing and I/O (input/output) cannot be overlapped. As a result, the computing resources of the database system are not fully utilized.

Run Formation Type II: Replacement Selection

Replacement selection is an alternative technique that produces longer runs and completely overlaps CPU processing and I/O. It is based on the observation that by tracking the highest key output thus far, the process can easily determine whether an incoming record can still be made part of the current run or should be deferred to the next run. Any record tacked on to the current run in this way increases the run length. Adding a record to the current run is expensive if a (sorted) pointer array is used, so replacement selection often uses a (binary) selection tree instead.

FIG. 2 shows a replacement selection process implemented in the database system 20. The process described below is the traditional version of the replacement selection algorithm as described, for example, by Donald Knuth in "The Art of Computer Programming, Volume. 3: Sorting and Searching", Second Edition 1998. This version of the algorithm assumes that records are of fixed length but, in practice, variable-length records are more common.

Initially, a subset of records is read into the main memory 22. When records are of fixed length, the main loop of the algorithm has three steps: selection, output, and get new record. In the "selection" step 1, the process selects from among the records in memory, a record with the lowest key greater than or equal to the last key output. Then, at the "output" step 2, the selected record is written out to the data storage 24 and the key value is remembered. Afterwards, at the "get" step 3, the process retrieves a new record from the data storage 24 and stores it in the slot previously occupied by the record just output.

While load-sort-store is more widely used, replacement selection has many benefits. First, replacement selection produces runs larger than the memory used, which reduces the number of runs and the subsequent merge effort. Second, replacement selection exhibits steady I/O behavior during run generation rather than I/O in great bursts. This improves the utilization of I/O devices. Third, it very effectively exploits pre-sorting to produce longer runs, i.e., input sequences that are not random but somewhat correlated to the desired sorted output sequence. In particular, if the input is already sorted, a single run will be generated. Fourth, sorting is often done as part of grouping with aggregation or for duplicate removal. A technique called early aggregation can then be applied, which reduces I/O significantly. Early aggregation achieves much higher I/O reduction if runs are created by replacement selection.

The following sections examine the selection step of replacement selection using a binary selection tree. The first section considers a tree formed with fixed length records, and a subsequent section examines the tree with variable length records.

Selection Tree for Fixed Length Records

The selection step is the most expensive part of the replacement selection operation. The selection step can be performed efficiently with the help of a selection tree, using the run number and the record key as the (compound) selection key. A selection tree for N records is a left-complete binary tree with N external nodes and N−1 internal nodes stored in an array without pointers. Logically, each external node or tree "leaf" stores a data record with a combined sort key consisting of a run number and the original sort key of the record. The combined sort key is here called a run-key pair and represented by a notation "run number, key" such as "1,12". Each internal node stores the lesser of the sort keys of its two children nodes plus a reference to the source node of the key. Physically, the selection tree and nodes can be implemented in several different ways.

FIGS. 3a and 3b show a selection tree 30 before and after a, selection replacement operation for replacing the lowest key on the first run (i.e., key 12 for run 1). FIG. 3a shows the initial state of the selection tree 30 with five keys (i.e., 5, 12, 15, 22, and 32). The key of the last record output was 8. External nodes or tree "leafs" are drawn as rectangles and internal tree nodes are shown as ellipses. The number to the left of a node indicates its position in the array.

Initially, the record represented by external node (1,12) is selected and output. Its key value "12" is now the last key value output, and this value is recorded. Outputting the record frees up the external node at position 9. A new record is input and stored in this node. The key of the new record is 30, which is higher than the last key value output (12) so the new record "fits" in the current run. Its run number is set to 1, resulting in the pair (1,30) shown in position 9. Next, a new minimum key is found by traversing the path from the external node at position 9 up to the root at position 1. At each node, the sort keys of two sibling nodes are compared and the node with the lower sort key is promoted to the parent node. For example, for external nodes (1,32) and (1,30) at positions 8 and 9, the key (1,30) at position 9 is less than the key (1,32) and is promoted to the parent node at position 4. Again, comparison of the internal nodes at positions 4 and 5 reveals that node (1,15) is less than (1,30) and is therefore promoted to parent node at position 2. The number of comparisons is always either floor(log2(N)) or ceil(log2(N)).

FIG. 4 shows one implementation of the selection tree 30 stored in an array 40, although the selection tree can be implemented in several different ways. A node consists only of a pointer 41 to a corresponding record, in a record data structure 42 in order to keep the tree itself of minimal size. The beginning of the array is offset so that each pair of sibling nodes occupies a common cache line. The type of a node is determined by its position in the array so the type need not be explicitly marked. Here, the internal nodes are at the top of the array and the external nodes are at the bottom. There are approximately twice as many nodes as records (i.e., 2N–1 nodes to N records), so the selection tree array adds approximately eight bytes of overhead per record.

A record slot 43 in the record data structure 42 contains a record consisting of a record key 44 and possibly some other fields 45. Each record slot also has two additional fields needed by the run formation algorithm, namely, a run number field 46 (e.g., 4 bytes), and a home node field 48 recording the position in the selection tree array of the external node that owns the record (e.g., 4 bytes). The last two fields 46 and 48 add another eight bytes of overhead per record, bringing the total overhead to sixteen bytes per record. The home node field 48 tracks the external node occupied by a record so that, when a record has been output, the new record can be placed in that tree node. Knuth's version of the algorithm handles this problem by adding a level of indirection: an internal node points to the external node owning the record, which in turn points to the actual record. The indirection increases cache misses during traversal because to locate a record the external node must first be accessed.

When records are of fixed length, the home node field can actually be eliminated—a records home node can be deduced from which record slot it occupies. However, this is not possible when records are of variable length.

Knuth's version uses two additional refinements: storing the loser instead of the winner in each internal node and packing one internal node and one external node together into a combined physical node. These changes make the algorithm harder to understand, but have little effect on its performance.

When records are of fixed length and the amount of memory available is known before run formation starts, the size of the selection tree can be determined before run formation begins. The tree is pre-allocated and filled with a fictitious run zero that is never output. Processing of an incoming record then consists of the following steps:

1. Record the key value and run number of the top record.
2. Copy the top record to an output buffer (provided it is not from the fictitious run zero).
3. If the output buffer is full, write it to the run file.
4. Copy the incoming record into the vacated slot in memory.
5. Determine its run number by comparing it with the recorded key value and set the run number field in the record.
6. Copy a pointer to the new record into the appropriate node in the selection tree. Call this node T.
7. Set the home node field in the record to point to T.
8. Fix up the path from node T to the root in the selection tree.

When there are no more input records, the memory is once again filled with fictitious records that are never output. The only operation performed is replacement, consisting mainly of copying two records and traversing a path from a leaf to the root.

Selection Tree for Variable Length Records

The above discussion of tree selection assumes that the records are of fixed length. When records are of variable length, two complications arise. First, managing the space reserved for storing records becomes more complex. Second, records are no longer just replaced in the selection tree. A record may be output and deleted from the tree without being replaced (if there is no free slot large enough for the replacement record). Similarly, records may be input and added to the tree without outputting any existing records. Consequently, the tree is no longer of constant size.

In the case of variable length records, it is better to view replacement selection as consisting of two processes: (1) an input process that fills memory with new records and adds them to the selection tree and (2) an output process that repeatedly deletes the top record from the tree and outputs it. The input process drives the processing. Whenever it fails to find memory space for an incoming record, it resumes the output process, which runs until it has created a free slot at least as large as needed by the new record. To purge all records when reaching the end of input, the input process requests space for an infinitely large record.

FIG. 5 illustrates the input process in which a new node (1,14) is added to the selection tree 30 from FIG. 3b. The new node (1,14) is added to the end of the tree after the last external node, as represented by insertion of node (1,14) into position 10 in the tree 30 (step 1 in FIG. 5). Because the tree is complete, its parent is always the first external node, which in this case is node (1,15) at position 5 (see FIG. 3b). The content of the parent node is copied into the next free node to become the right sibling node of the new element, as represented by new node (1,15) in position 11 (step 2 in FIG. 5).

A different external node now owns the record, so the home node field in the record has to be updated from position 5 to position 11. In addition, the parent node changes its role from an external node to an internal node. The sort keys of the two new external sibling nodes (1,14) and (1,15) are compared and the lower one promoted to the parent node (step 3 in FIG. 5). In this case, the new node (1,14) contains the lower key and it is promoted to position 5. The walk up the tree continues until there is no change; that is, the record that gets promoted is the same as the one already stored in the parent node (step 4 in FIG. 5). In this case, the node (1,14) is promoted all the way to the root node at position 1. However, in other cases, the traversal may not continue all the way to the root.

FIGS. 6a and 6b show the output process in which a node is deleted from the selection tree. The node with the lowest key is always the one deleted. Using the tree in FIG. 3b, suppose the output process deletes the external node (1,15) from the selection tree 30. First, the target node (1,15) is exchanged with the last node (1,30) of the tree 30 and the home node fields of both records are updated (step 1 in FIG. 6a).

The two tree paths affected by the exchange are then fixed up (step 2 in FIG. 6a). As a result of the exchange, the last node will always contain the lowest key. Accordingly, to fix up the path from the last node, every internal node on the path to the root is updated to point to this record without the need for key comparisons. The other path affected by the exchange is updated in the normal way by comparing keys. In this case, the internal node (1,15) at position 4 has a lower key value than the external node (1,30) at position 5, and hence the traversal stops here and does not continue all the way to the root. The result is a valid selection tree with the lowest run-key pair (1,15) as the last external node of the tree.

Following the path update, the target node (1,15) in the last position is deleted from array 40 (step 3 in FIG. 6b). This deletion causes external node (1,32) to move to its parent node at position 4 (step 4 in FIG. 6b). The path from there is then fixed up all the way to the root (step 5 in FIG. 6b), causing node (1,22) to be promoted to the top.

Memory Management

When records are of variable length, managing the space reserved for storing records becomes an issue. In an article by Per-Åke Larson and Goetz Graefe, entitled "Memory Management during Run Generation in External Sorting", *SIGMOD*, 1998: 472–483, the authors showed that a version of best-fit allocation solves this problem efficiently, resulting in a memory utilization of 90% is or better. The basic idea of best-fit allocation is to always allocate space from the smallest free block large enough for the record being stored. If the selected free block is larger than required, the unused space is returned to the pool as a smaller free block. Immediate coalescing of adjacent free blocks and the use of boundary tags is recommended for efficiency. Best-fit allocation depends on being able to locate the smallest block larger than a given size efficiently. One technique is to store a collection of free blocks in a (balanced or unbalanced) binary tree with the block size as the key. If the tree is kept balanced (e.g., an AVL-tree), the best-fitting free block can always be located in logarithmic time. An alternative technique is to maintain multiple free lists segregated by block size. For example, we may use 256 free list and keep all free blocks of size 16 bytes or less on list 1, all free blocks between 17 and 32 bytes on list 2, and so on. In practice this technique is much faster and, consequently, is the preferred implementation.

Drawbacks of Classical Replacement Selection

Modern CPUs rely heavily on caches to hide memory latency and increase overall performance. As a result, it is increasingly important to design algorithms that generate few cache misses. Unfortunately, the classical replacement-selection algorithm has poor cache behavior when the number of records in memory is large. The main loop of the algorithm consists of traversing a path of the selection tree from a leaf node to the root, while comparing sort keys of each sibling pair. Which path is traversed is unrelated to previously used paths. The nodes in the top part of the tree, and their associated sort keys, are touched frequently and are likely to remain in the cache but not the ones lower down in the tree.

Accordingly, there is a need for a cache-conscious version of replacement selection, which reduces the number of cache misses significantly.

SUMMARY

This invention concerns large scale sorting technology for forming runs of data records using an improved cache-friendly replacement selection process that reduces cache misses.

In one implementation, a database system has a memory subsystem with persistent data storage (e.g., disks, RAID, etc.) and a main memory. The system also has at least one processing unit with a processor and cache memory (e.g., L1 and L2 caches). A selection tree is formed in the main memory as an array of pointers to records that are being sorted. The system also has a mini-run assembly data structure stored in the main memory to create mini-runs of sorted records prior to adding the records to the selection tree.

The system runs a large-scale sorting program having a batched replacement selection module for forming runs of sorted data records. The batched replacement selection module reads multiple records from the persistent data storage into main memory, adds them to the mini-run assembly data structure and, whenever the mini-run assembly structure becomes full, sorts its records to form a mini-run of multiple sorted data records. As an example, a mini-run might consist of 500 records sorted according to their key values. After formation, the mini-run is added to the selection tree by inserting a pointer to a first record in the mini-run into the array of pointers. The first record is linked to remaining records in the mini-run.

The batched replacement selection module selects a record for output from a node in the selection tree. If the mini-run associated with the node is not empty, the module replaces the selected record with a next record from the mini-run. Once the mini-run becomes empty, the module deletes the node. In this manner, the selection tree grows and shrinks as mini-runs are added and deleted.

When main memory becomes full, the batched replacement selection module switches to output mode. It selects some number of records for output using the selection tree and copies the selected records into an output buffer in main memory. Whenever the output buffer becomes full, the module writes contents of the buffer back to the persistent data storage at the end of the current run. Exactly how long the output process runs is a matter of policy. Two possible policies are: stop after a predetermined number of records have been output or stop after a predetermined number of output buffers have been filled.

The combination of using pre-sorted mini-runs as tree nodes and batch processing input/output records significantly reduces the number of cache misses (particularly, L2 cache misses).

BRIEF DESCRIPTION OF THE DRAWINGS

FIG. 4 is a diagrammatic illustration of a data array used to implement the selection tree of FIG. 3a.

DETAILED DESCRIPTION

This invention concerns a cache-conscious replacement selection methodology that employs local batch processing to improve performance on modern-day CPUs. For discussion purposes, the invention is described in the context of a uni-processor system although the invention may be employed in a shared-memory multiprocessor system (SMP).

System

Figure 7:
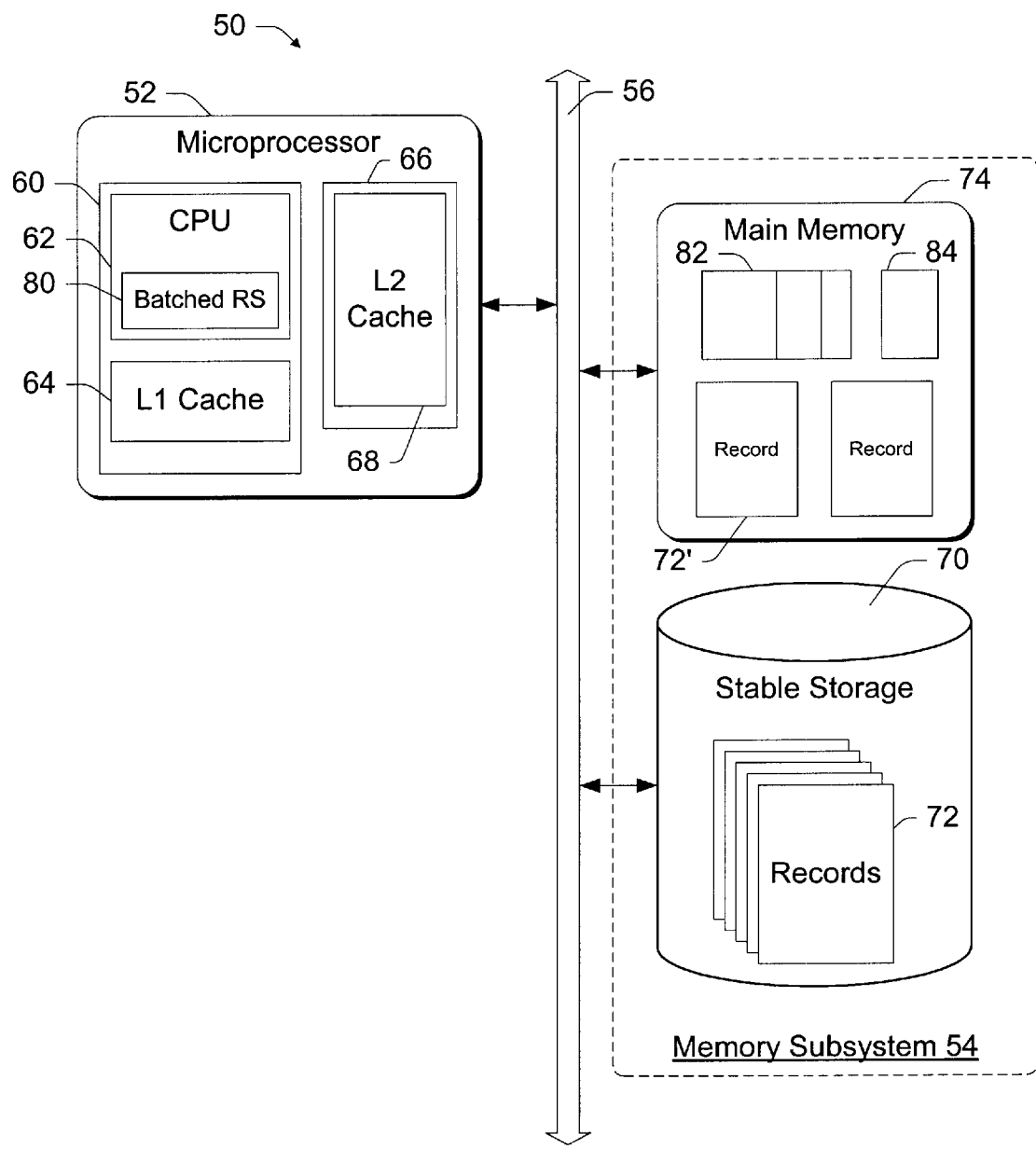
FIG. 7 shows a database storage system that implements a batched replacement selection process.

FIG. 7 shows a database storage system 50 implemented on a computer having a processor 52 coupled to a memory subsystem 54. A system bus (or other interconnection network) 56 interconnects processor 52 and memory subsystem 54.

The processor 52 has a chip 60 that holds a CPU (central processing unit) 62 and a first level (or L1) cache 64. The processor 52 also has a second level (or L2) cache 68 that may be on the same or a different chip (as represented by chip 66). The L1 cache 64 is considerably smaller than the L2 cache 68. For example, the L1 cache 64 typically ranges in size from 16 Kbytes to 256 Kbytes, whereas the L2 cache 68 typically varies from 128 Kbytes up to 4 Mbytes. Due to its proximity to the CPU 62, however, the L1 cache 64 has a significantly lower access time in comparison to the L2 cache 68. Typically, the access time to remote L2 cache 68 is five times longer than the access time to L1 cache 64.

The memory subsystem 54 has a persistent storage 70 that provides the bulk of the data storage. The persistent storage 70 is stable and persists across system crashes. Examples of such storage include disk, RAID (redundant array of independent/inexpensive disks) storage systems, tape systems, and so forth. Data is stored in storage 70 as records 72.

The memory subsystem 54 also has a main memory 74 that comprises volatile memory, non-volatile memory, or a combination of both. During program execution, a subset of record 72' is read from the persistent memory 70 into the main memory 74. The computer system 50 thus forms a hierarchical memory system having tiers ranging from small, high-speed memory (e.g., L1 cache 64) to large, slow access memory (e.g., stable storage 70).

The system 50 runs an application program that performs large-scale sorts, such as the mergesort operation. The application program may be a database program, such as a relational database program (e.g., SQL Server program from Microsoft Corporation). It is also noted that aspects of this invention may be implemented in other types of programs that may employ database concepts, such as spreadsheet programs, accounting software, workflow management software, and the like.

As part of the sort operation, the application program forms runs of data records using a replacement selection process. As noted in the Background, the traditional version of replacement selection has poor locality of reference and generates frequent cache misses (primarily, L2 cache misses). According to an aspect of this invention, the CPU runs a batched replacement selection (RS) process 80 that generates significantly fewer L2 cache misses. The batched RS process 80 is illustrated as a software module executed on the microprocessor 52. The module may further be stored in main memory 74.

The batched selection replacement process uses a selection tree to sort the records into runs. Entries in the selection tree are loaded into L2 cache 68, and the sort keys of few records from the data in L2 cache 68 can be further loaded into L1 cache 64 for highest access speed.

Traditionally, the selection tree has as many external nodes as there are records. That is, each external node consists of one record. With batched replacement selection, the selection tree is formed with a small batch of sorted records attached to each external node. This reduces the size of the tree. The small batches of sorted records are referred to as "mini-runs" to distinguish them from the eventual output runs.

The selection tree is implemented in FIG. 7 as a data array 82 that contains pointers to the records 72' in main memory. The external nodes contain pointers to the first record in a mini-run. The first record then references the next sorted record, and so on. Accordingly, the linked list of records forms the mini-run associated with each external node. Another data structure 84 is employed to assemble the mini-runs as records are input to the selection replacement process. When the data structure is full, the assembled mini-run is added to the selection tree as an external node. The data array 82 and data structure 84 are described below in more detail with reference to FIGS. 9 and 10.

Batched Replacement Selection

The batched replacement selection process facilitates a cache-friendly; methodology that reduces cache misses. The process implements two techniques: (1) adding sorted mini-runs to the selection tree; and (2) batched processing of the input and output records. The combination of these techniques significantly reduces cache misses at the L2 cache level. As an example, during experimentation, the inventors observed a 50% reduction of L2 cache misses for 100 byte records and 20 MB of memory.

I. Mini-Run Utilization

A first part of the batched replacement selection process is to create sorted mini-runs and add them as nodes to the selection tree. The mini-runs replace single record nodes at the external leaf nodes of the selection tree. This helps compact the size of the tree. FIGS., 8–10 illustrate an exemplary selection tree and associated data structures to implement the tree and form the mini-runs.

Figure 1:
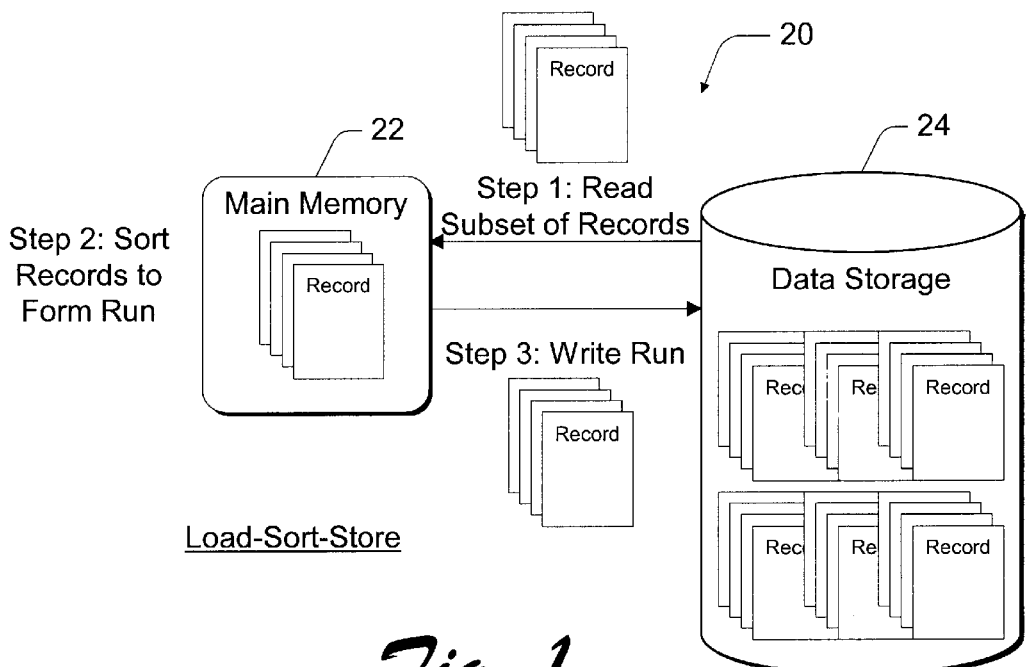
FIG. 1 is a diagrammatic illustration of a database system implementing a conventional load-sort-store process for run formation in large-scale mergesort operations.
Figure 2:
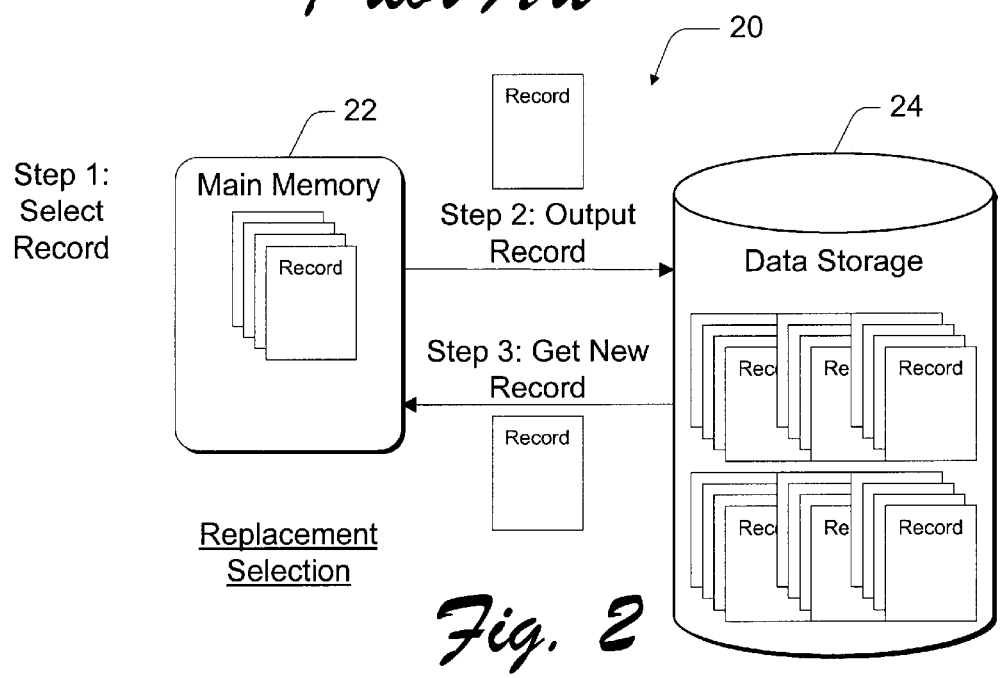
FIG. 2 is a diagrammatic illustration of a database system implementing a conventional replacement selection process for run formation in large-scale mergesort operations.
Figure 3A:
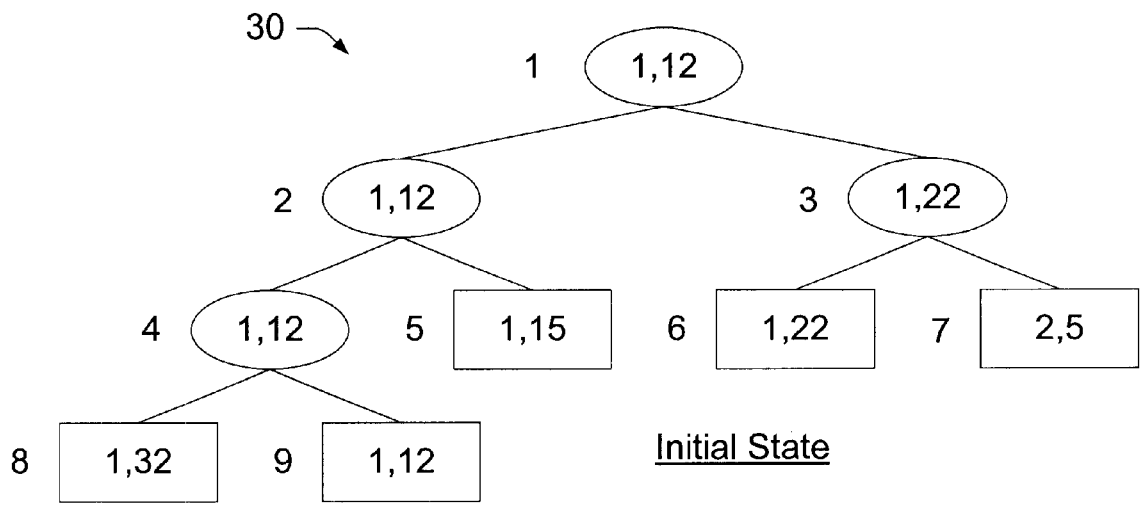
FIGS. 3a and 3b show a selection tree before and after a selection replacement operation is performed on a leaf node.
Figure 3B:
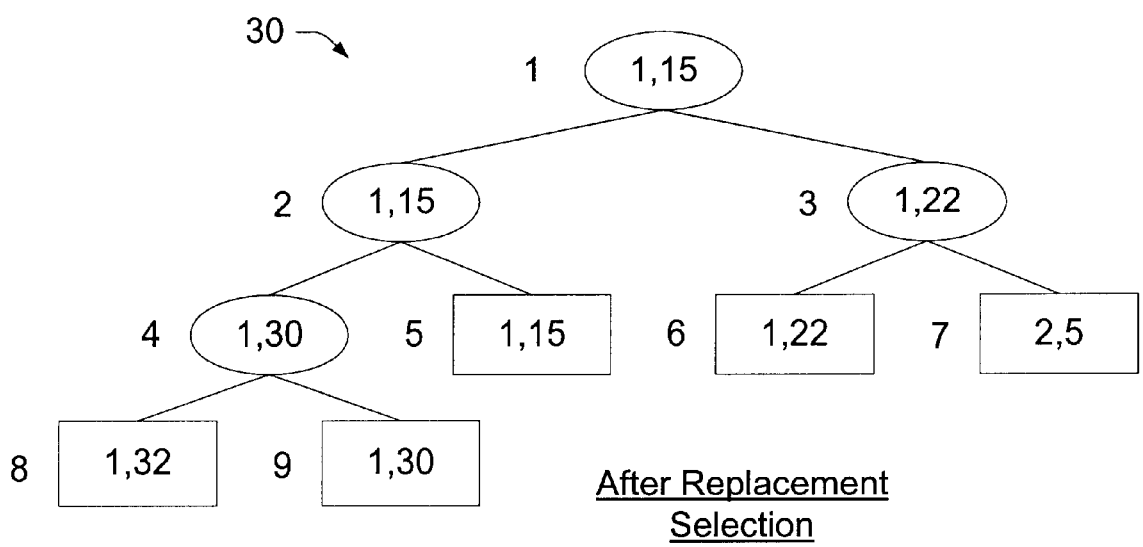
Figure 4:
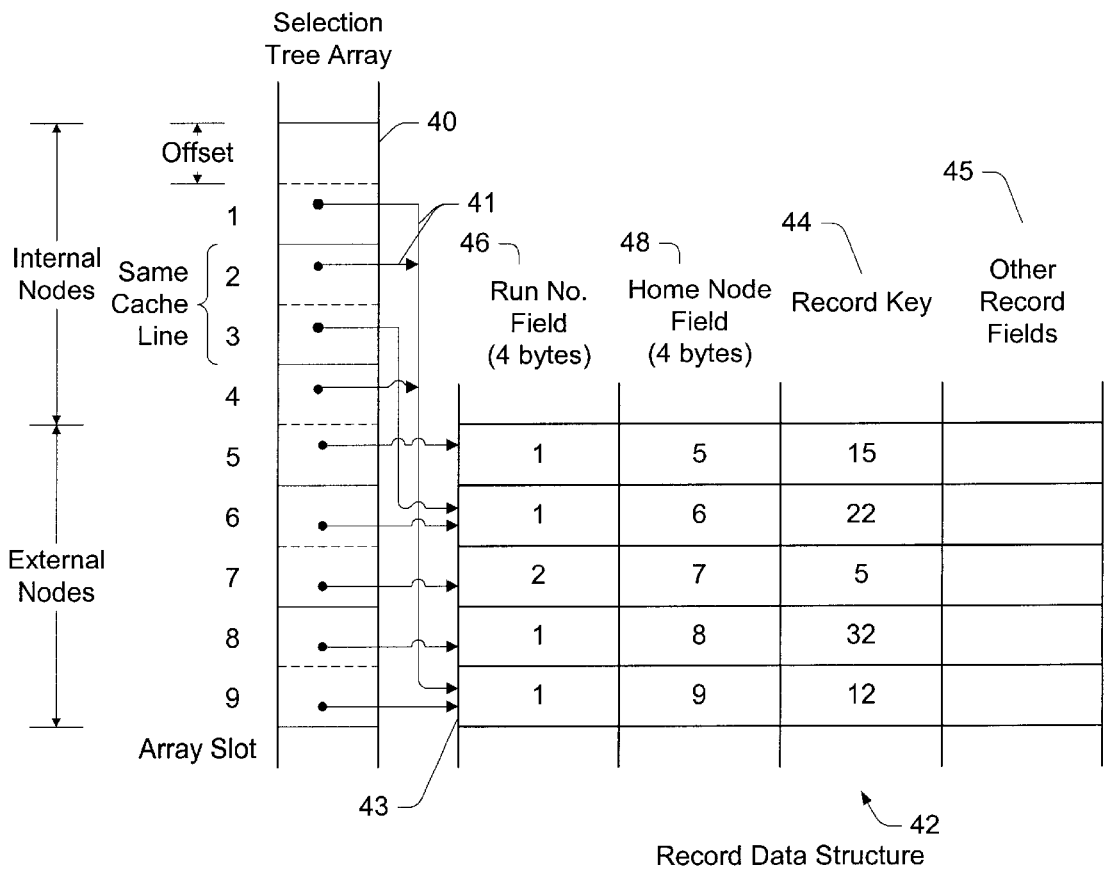
Figure 5:
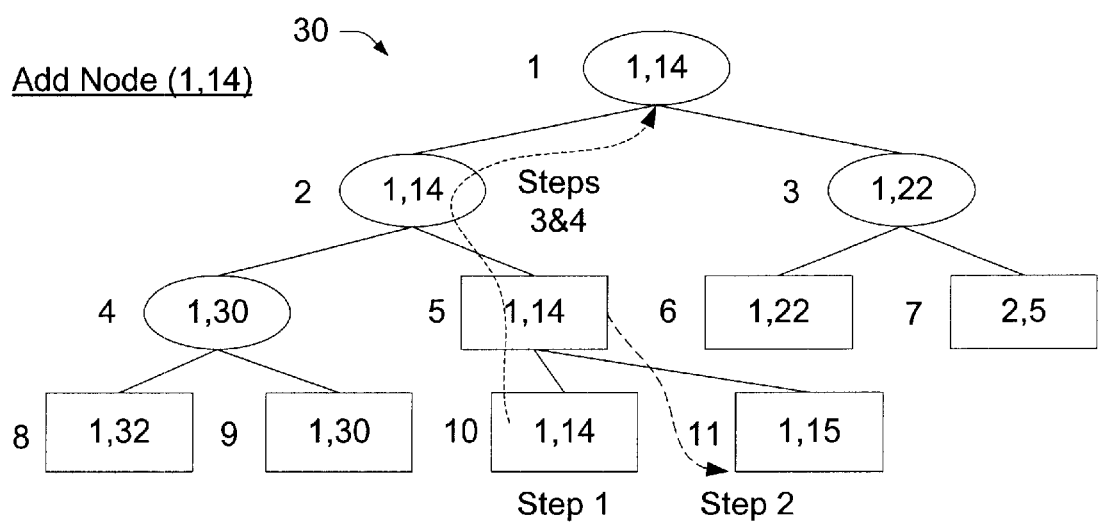
FIG. 5 is a diagrammatic illustration of a selection tree and illustrates the addition of a node to the selection tree.
Figure 6A:
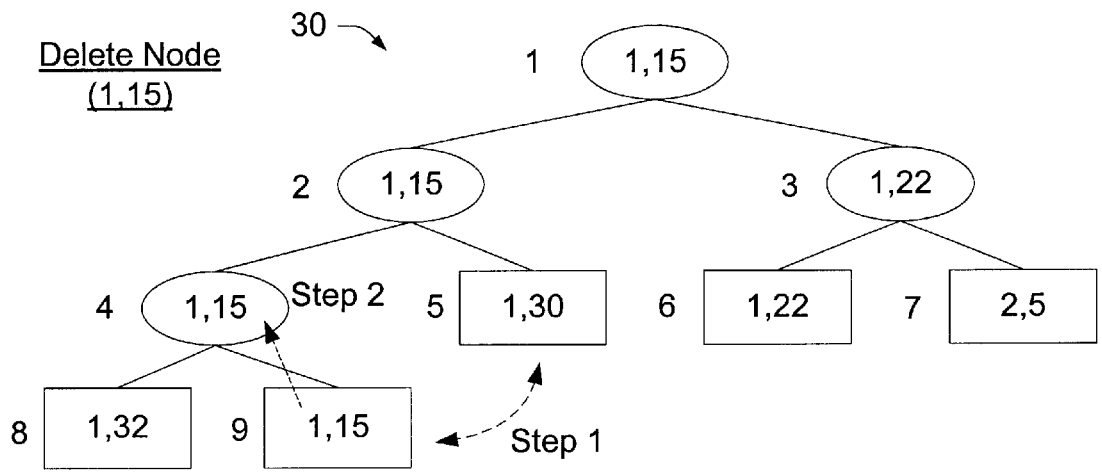
FIGS. 6a and 6b are diagrammatic illustrations of a selection tree and illustrate the deletion of a node from the selection tree.
Figure 6B:
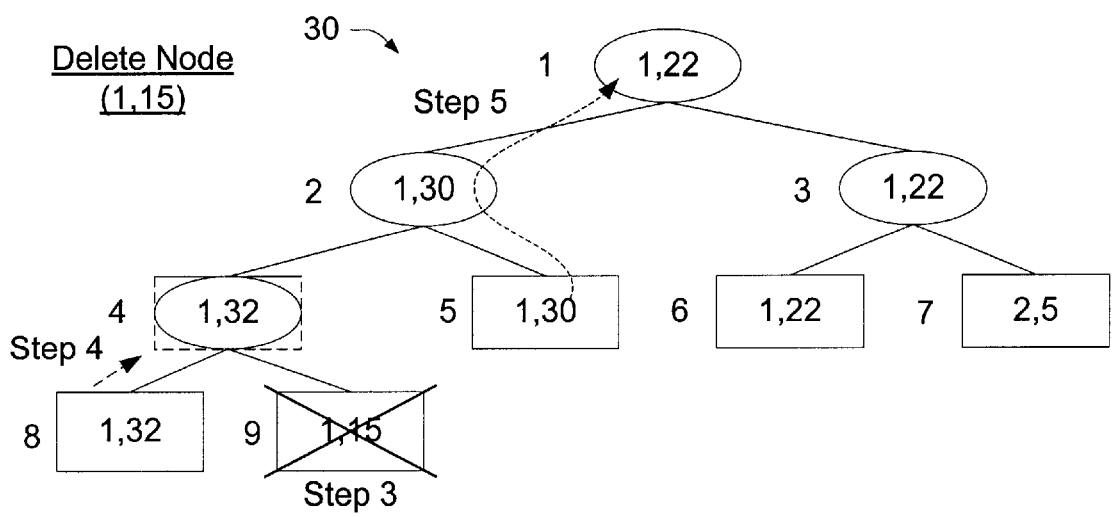
Figure 8:
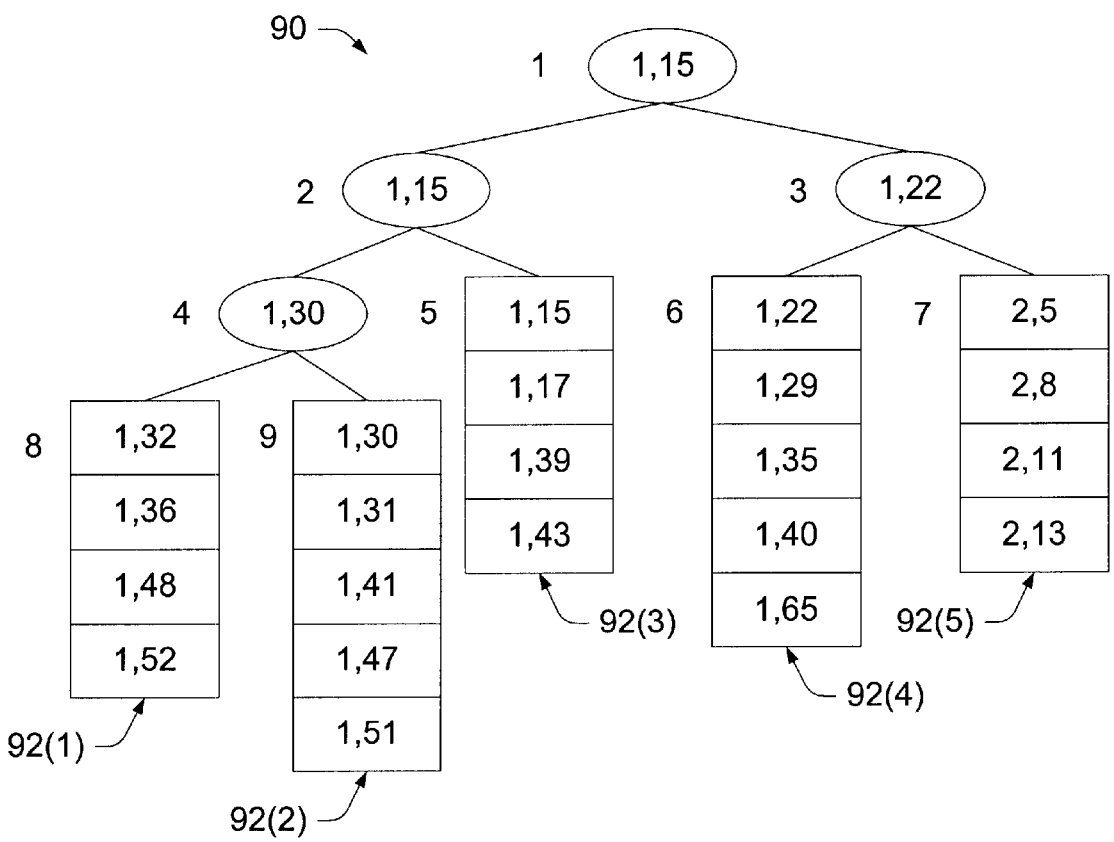
FIG. 8 is a diagrammatic illustration of a selection tree with mini-runs attached at the external leaf nodes.

FIG. 8 shows an exemplary selection tree 90 that is similar to tree 30 in FIG. 3b, except that the external nodes are formed of mini-runs 92(1)–92(5). The mini-runs 92(1)–92(5) contain a short set of sorted records. Typically, the mini-runs; consist of 500–1000 sorted records. For illustration purposes, the mini-runs are shown with only a few records. For easier readability, the figure shows the mini-runs as arrays of records even though the preferred implementation is a linked list. For example, mini-run 92(1) at node position 8 contains four records: record (1,32); record (1,36); record (1,48); and record (1,52). These records are sorted according to their run number (all "1" in this example) and key value "32", "36", "48", and "52". It is noted that the tree may also be configured to store key prefixes.

When a record is output, the next record in its mini-run replaces it and the selection tree is updated by propagating the lowest key up the tree. For instance, if record (1,15) is output, the next record (1,17) in mini-run 92(3) is placed in the external node 5. The record keys of nodes 4 and 5 are compared (i.e., record (1,17) has a lower key than record (1,30)), and hence record (1,17) is propagated up to node 2, and eventually to root node 1.

When a mini-run becomes empty, there is no replacement record. The empty node is removed in the manner described earlier, thereby shrinking the tree. For example, when the last record (1,43) in mini-run 92(3) is output, there are no more records in this mini-run. When this happens, the target node (1,43) is exchanged with the mini-run 92(2) at the last node 9 of the tree 90 and the tree paths affected by the exchange are fixed up. Following the path update, the target node (1,43) in the last position is deleted. However, note that the use of mini-runs significantly reduces the number of times the selection tree shrinks and grows.

Figure 9:
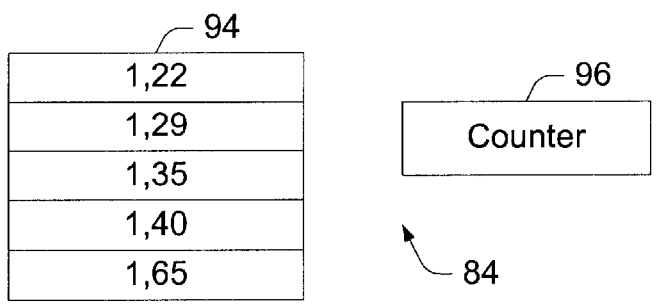
FIG. 9 is a diagrammatic illustration of a data structure used to assemble mini-runs.

Incoming records are placed in memory but are not added individually to the tree. Instead, the incoming records are assembled into mini-runs in data structure 84 (FIG. 7). FIG. 9 shows the mini-run assembly data structure 84 as having an array of record pointers 94 and a counter 96 to track the number of records in the array. For illustration purposes, the mini-run assembly data structure 84 holds the sorted mini-run 92(4) for the external node at position 6 (FIG. 8). When the current mini-run becomes full, the run number of each record in the batch is determined and the records are sorted (e.g., using Quicksort). The records in the mini-run are then linked together in sorted order. The first record in the mini-run is then added to the selection tree. In this manner, the size of the selection tree varies as mini-runs are added and deleted.

Figure 10:
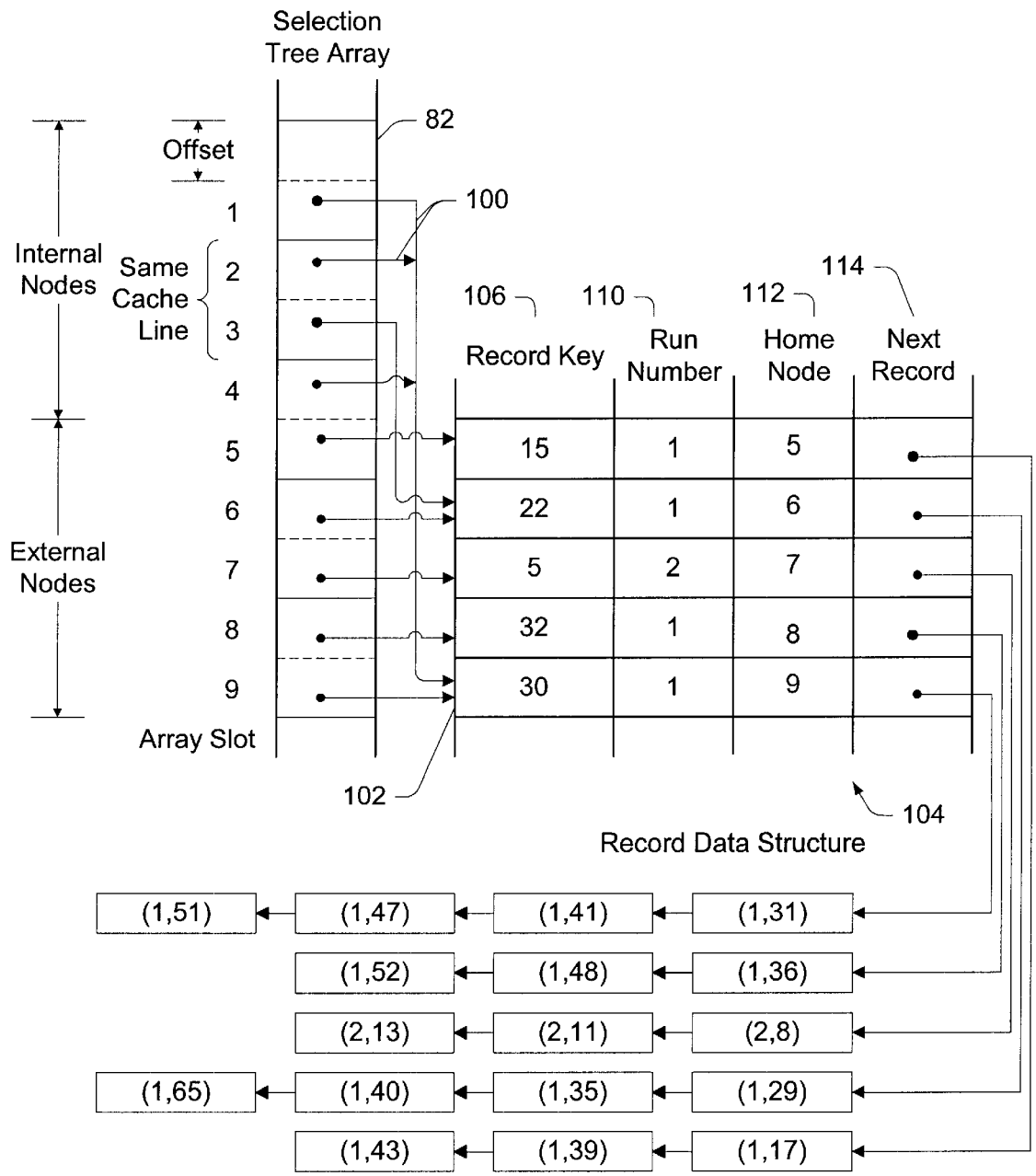
FIG. 10 is a diagrammatic, illustration of a data array used to implement the selection tree of FIG. 9.

FIG. 10 shows the selection tree 90 implemented in array 82. A node in the selection tree contains a pointer 100 to a corresponding record 102 in a record data structure 104. Each record 102 contains a record key 106 and possibly some other fields (not shown). Each record 102 also has three fields for replacement. selection: a run number field 110 to identify the run within which the record belongs, and a home node field 112 to index the record's home slot in the selection tree, and a next record field 114 to hold a pointer to the next record in the mini-run. All records in a mini-run contain the same fields but for easier readability only the first record in each mini-run is shown in detail.

The record slots for the external nodes reference the first remaining record in a mini-run. As an example, slot 8 in array 82 references record (1,32) as the first record in run 92(1). The mini-runs are linked together so that the previous record references a next record. Here, record (1,32) references the next record (1,36), which in turn references the next record (1,48), and so on. Linking requires less space than representing a mini-run by a pointer array (although this is possible).

Collecting records into mini-runs reduces the size of the selection tree and the set of keys participating in comparisons when traversing the tree. It can be shown that mini-runs are on average half full, meaning that a mini-run size of B records reduces the tree size by a factor of B/2 and thus the number of tree levels by log2(B/2). For example, using mini-runs of 512 records reduces the selection tree by a factor of 256 or 8 levels. Each level may generate two or three L2 cache misses during traversal so the potential saving is 16 to 24 misses.

The selection tree is now much smaller in comparison to trees, employed in conventional replacement selection processes. It might make sense to use an indirection scheme in which an internal node points to an external node which, in turn, points to the actual record. If indirection is adopted, the home node field in each record slot can be eliminated, thereby saving a significant amount of memory. Another possibility is to include both a pointer to the record and a pointer to the external node in each internal node.

II. Batched Processing of I/O Records

A second part of the batched replacement selection process is the batch processing of input and output records. Recall that replacement selection can be viewed as consisting of an input process in which records are read into main memory and an output process in which records are written out to the data storage. Traditional selection replacement inputs/outputs, on average, one record at a time. With batch processing, the input and output processes are performed for many records at a time.

In general, the I/O process is implemented as two short loops:

1. An input loop fills the available free memory space with new records and adds them to mini-run assembly data structure 84 in main memory 74. For instance, the input loop might read in 500 records to fill the available free memory. Whenever the current mini-run structure 84 is full, the records are sorted into a mini-run and the mini-run is added to the selection tree. Whenever there is no more free space for an incoming record, the process switches to the output loop.

2. An output loop selects and outputs a batch of, say, 1000 records and then switches to input mode. Whenever a mini-run in the tree becomes empty, the corresponding external node is deleted and the tree shrinks. As soon a record has been copied to an output buffer, its memory space is returned to the free pool. Output buffers are written to disk as soon as they become full.

Batch processing reduces the working set and number of cache misses. For example, when switching to the output loop, the selection tree and related keys have probably been expelled from the cache. There is first a flurry of cache misses but pretty soon large parts of the tree and the active keys will have been loaded into the cache and most activity takes place in the cache. Similar arguments can be made regarding the effects of input batching.

Switching from input mode to output mode is governed by whether an incoming record can be placed in memory. Switching back from output mode to input mode is governed by how large of an output batch is desired and supportable. There is no reason to switch back to the input mode until a free slot large enough to store the incoming record has been created. Beyond that, several rules are possible: (1) output a fixed number of records; (2) fill one output buffer, issue a write and switch; and (3) output until a certain percentage of the memory space has been freed up. In the experiments described below, the first rule is employed.

Operation

Figure 11:
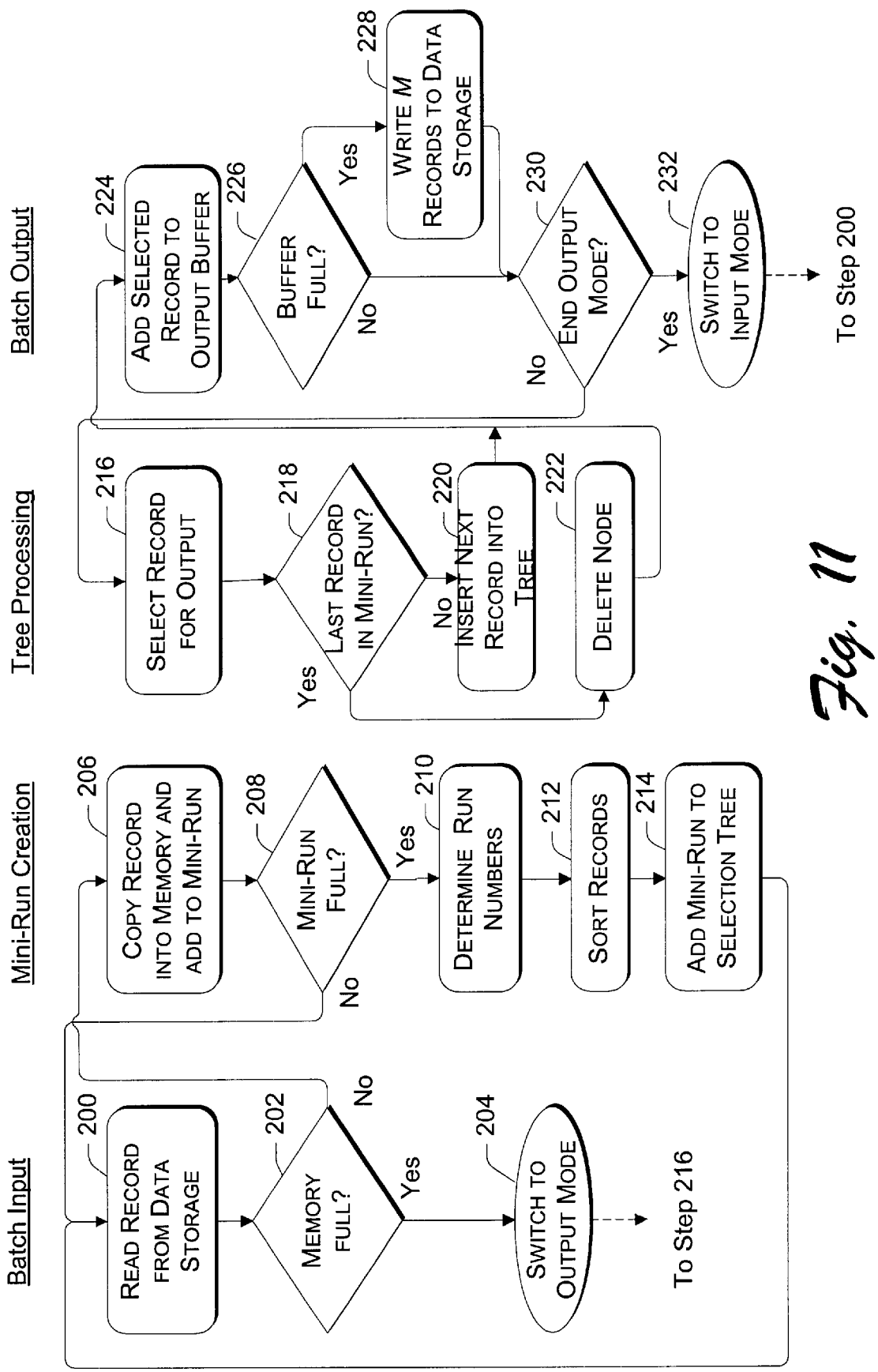
FIG. 11 is a flow diagram for a batched replacement selection process.

FIG. 11 shows a batched replacement selection process. It consists of two cooperating process loops: (1) batch input, including mini-run creation and addition to the selection tree; (2) batch output, including record selection using the selection tree. The process loops may execute simultaneously such that, for example, mini-runs are being created for input to the selection tree at the same time that records in the tree are being processed. Alternatively, as illustrated in FIG. 11, the batch input and batch output loops may execute in alternating fashion, switching back-and-forth between the input and output modes. The batched replacement selection process described in FIG. 11 is performed in software, preferably by the batched RS module 80 executing on the processor 52.

Beginning with the batch input process, multiple records are read from storage 70 into the main memory 74 until memory becomes full (steps 200, 202 and 206). At the same time, the mini-run assembly data structure 84 is filled (steps 206 and 208). Once the data structure 84 is fill, the records in the data structure 84 are sorted to form a mini-run. At step 210, the run number of each record in the full data structure 84 is determined. The records are then sorted in the data structure 84 to form a mini-run (step 212). The mini-run is added to the selection tree by inserting its first record as the last external node in the tree and the tree is updated to reflect the addition of the new node (step 214).

Meanwhile and perhaps concurrently with the mini-run creation process, a tree process is underway extracting, in sorted order, the records contained in the selection tree. The tree process selects a record with the lowest key for output (step 216). If this is not the last record in the mini-run (i.e., the "no" branch from step 218), the next record in the mini-run is inserted into the external node (step 220). When a mini-run becomes empty, however, there is no replacement record. Accordingly, the node is removed to shrink the selection tree (step 222).

The selected records are collected and held in a buffer in main memory 74 for batch output to the data storage 70 (step 224). When the buffer becomes fill, the process writes it out to the data storage 70 (step 228). After a predetermined number of records have been collected and written out, the process switches back to the input mode for batch input of data records (step 232).

Experimental Results

A series of experiments were conducted to evaluate the performance of batched replacement selection in comparison with other run formation techniques. All experiments were run on 300 MHz Pentium II processor with a 512 KB unified L2 cache and two 16 KB L1 caches, one for data and one for instructions. The machine had 128 MB of memory and two 9GB SCSI disks (Seagate, Barracuda 9, Ultra SCSI).

Unfortunately, the cache miss penalty on Pentium II processors is not a simple number; it depends on the circumstances. Pentium II is a superscalar processor with out-of-order execution. This means that when one instruction stalls on a cache miss, the processor attempts to continue executing other instructions. If so, this masks some of the cache penalty. Furthermore, reading or writing to memory is not a simple fixed-duration operation; a read/write request may have to wait for the bus and/or memory module to serve other requests. Accordingly, there is an assumption that an L1 cache miss costs 5 cycles and an L2 cache miss costs 50 cycles. Though probably not entirely correct, these estimates are off by at most a factor of two. On the latest 500 MHz Pentium III processors, 10 cycles and 100 cycles, respectively, are better estimates.

In the experiments, four methods were compared: classic replacement selection, batched replacement selection, load-sort-store using Quicksort, and load-sort-store using Alpha-Sort. AlphaSort is a cache-conscious in-memory sorting algorithm that is well suited for run formation. In all experiments, records were generated randomly in memory (not read from disk). The key of each record was a string randomly selected from a list of 25,084 English words, extended with a filler character to a total of 30 characters.

CPU Performance—No I/O

The first series of experiments focused on the CPU behavior of the various techniques without I/O. Records were copied into output buffers but the actual writes were omitted. Two series of experiments are reported here: one with 100-byte fixed-length records and one with variable length records with an average length of 100 bytes.

Figure 12:
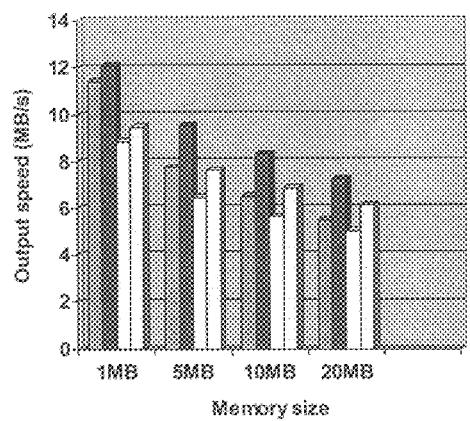
FIG. 12 shows the overall performance of the four methods—Quicksort, Alphasort, classic replacement selection, and batched replacement selection—as a function of memory size.
Figure 12:
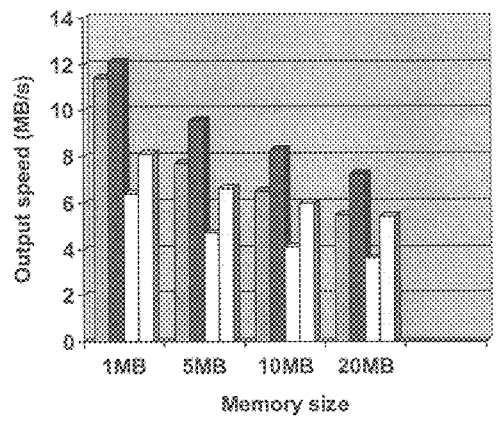

FIG. 12 shows the overall performance of the four methods—Quicksort, Alphasort, classic replacement selection, and batched replacement selection—as a function of memory size. Performance is measured by throughput in MB per second (i.e., the total amount of sorted run data output per second by each method). The first observation is that throughput decreases as memory size increases. Note though that as memory size increases, fewer runs are generated and more of the sort work has been done. Second, the two cache-conscious methods (AlphaSort and batched replacement selection) are faster than their cache-oblivious counterparts (Quicksort and classic replacement selection). Third, AlphaSort is the fastest overall, but it produces shorter runs than replacement selection (i.e., it does a smaller share of the overall sort work).

Table 1 provides more detailed information on elapsed time in CPU cycles, instructions executed and cache misses for memory size 20MB. All figures are per record processed. First, the batched replacement selection generates about 50%. fewer L2 cache misses than classical replacement selection. The number of L1 cache misses also drops but significantly less. Second, reducing L2 cache misses pays off. For fixed-size record, batched replacement selection actually executes 7.7% more instructions than the classical algorithm (2688 versus 2494) while running 16.7% faster (4776 versus 5737 cycles). For variable-size records, batched replacement selection is as much as 33.5% faster. Finally, the number of clock cycles per instructions is high. The Pentium II is a superscalar processor capable of retiring two instructions per cycle, which translates to 0.5 cycles per instructions. Here, between 1.78 and 2.30 cycles per instructions were observed, meaning that the processor runs at about a quarter of its peak performance.

TABLE 1

|  | Load-sort-store | | Replacement selection | | | |
|  | Quick-sort | Alpha-Sort | Fixed size | | Variable size | |
|  |  |  | Classic | Batched | Classic | Batched |
| Cycles | 5248 | 3919 | 5737 | 4776 | 7954 | 5284 |
| Instructions | 2754 | 2143 | 2494 | 2688 | 3979 | 2861 |
| Cycles/instruction | 1.91 | 1.83 | 2.30 | 1.78 | 2.00 | 1.85 |
| L1 cache misses | 51.68 | 44.46 | 52.54 | 47.73 | 79.94 | 53.52 |
| L2 cache misses | 25.11 | 14.73 | 24.13 | 12.04 | 27.76 | 14.85 |

Table 2 compares the number of key comparisons performed by the various methods. A large part of the total time is consumed by key comparisons so it is important to keep the number of comparisons low. The number of comparisons for batched replacement is slightly lower when records are of variable size because fewer records fit in memory and runs are slightly shorter.

TABLE 2

| Memory size, MB | Load-sort-store | | Replacement selection | | | |
|  | Quick-sort | Alpha-Sort | Fixed size | | Variable size | |
|  |  |  | Classic | Batched | Classic | Batched |
| 1 | 16.6 | 14.3 | 13.5 | 15.7 | 21.2 | 15.6 |
| 5 | 20.0 | 16.6 | 15.9 | 18.2 | 26.4 | 18.0 |
| 10 | 21.6 | 17.6 | 16.9 | 19.2 | 28.4 | 19.0 |
| 20 | 23.4 | 18.6 | 17.9 | 20.2 | 30.5 | 20.0 |

Table 3 lists the number of runs output and average run length (relative to memory size) for different memory sizes and an input size of 50× the memory size. The experiments show that batched replacement selection produces slightly longer runs than the traditional replacement selection, mostly because the selection tree requires less space. Compared with Quicksort and AlphaSort, batched replacement selection produces about 45% fewer runs for fixed-length records and about 40% fewer for variable-length records.

TABLE 3

| Memory size (MB) | Input size (MB) | Load-sort-store | | Replacement selection | | | |
|  |  | Quick-sort | Alpha-Sort | Fixed size | | Variable size | |
|  |  |  |  | Classic | Batched | Classic | Batched |
| 1 | 50 | 51/0.96 | 52/0.94 | 29/1.66 | 31/1.66 | 33/1.46 | 35/1.44 |
| 5 | 250 | 51/0.96 | 52/0.94 | 26/1.70 | 30/1.72 | 33/1.47 | 33/1.52 |
| 10 | 500 | 51/0.96 | 52/0.94 | 28/1.70 | 29/1.76 | 33/1.47 | 33/1.53 |
| 20 | 1000 | 51/0.96 | 52/0.94 | 28/1.70 | 29/1.76 | 33/1.47 | 33/1.53 |

Performance with I/O Included

Two series of experiments were run with I/O included: one series writing to a single disk and one series writing to two disks in parallel. (The input records were generated on the fly so no input disks were required in these experiments.) All experiments used output buffers of size 64 KB. To allow concurrent writing to disk and CPU processing, the number of buffers was set to the number of disks plus one. Writes were asynchronous, allowing full overlap of I/O and CPU processing. All writes bypassed the file system cache completely, thereby, avoiding one round of copying.

Figure 13:
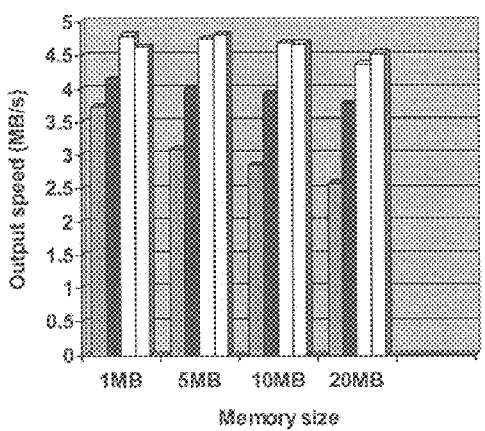
FIG. 13 shows results of experiments on four methods—Quicksort, Alphasort, classic replacement selection, and batched replacement selection—run with a single disk.
Figure 13:
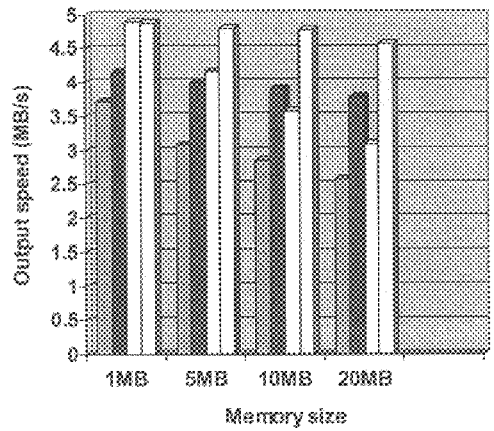
Figure 14:
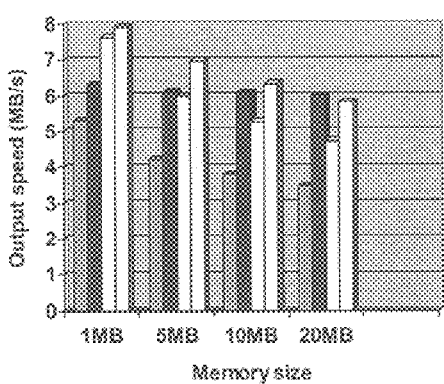
FIG. 14 shows results of experiments on four methods—Quicksort, Alphasort, classic replacement selection, and batched replacement selection—run with two disks.
Figure 14:
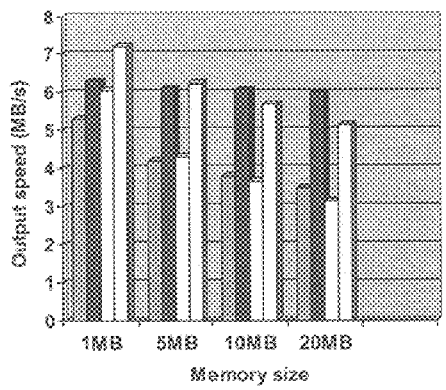

FIG. 13 plots the throughput for one disk and FIG. 14 for two disks. Replacement selection overlaps CPU processing and writing completely so the total throughput is limited by the slower of the two activities.

FIG. 13 shows that the maximum output rate for a single disk is around 4.5 MB/s. For fixed-sized records, both versions of replacement selection are able to keep up with the disk. When records are of variable length, more time is spent on memory management. Batched replacement selection is still able to keep up with the disk, but the traditional version cannot and its throughput drops as memory size increases. When writing runs to a single disk, batched replacement selection was the fastest and produced the fewest runs.

In FIG. 14, the situation is different when the output bandwidth increases. When writing to two disks, the maximum output rate is around 8 MB/s. When memory is small and records are of fixed size, replacement selection is fast enough to keep both disks busy but the output rate drops when memory size increases or records are of variable length.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for forming an output run of data records using a selection tree, the method comprising:
   reading multiple data records into a memory from an input stream;
   forming mini-runs from the multiple data records;
   adding the mini-runs as leaf nodes of the selection tree;
   selecting multiple records for output from the mini-runs;
   collecting the selected records into a batch of selected records, the batch having a predefined size; and
   outputting the batch of selected records,
   wherein the selecting, collecting, and outputting steps are performed together as a batch output routine, and wherein the method further includes switching to an input routine following the outputting of the batch of selected records,
   further wherein the selection tree has a dynamically varying size.

2. A method as recited in claim 1, wherein the forming further comprises sorting the multiple records.

3. A method as recited in claim 1, wherein the adding comprises inserting first records from each of the mini-runs as the leaf nodes of the selection tree and linking the first records to remaining records in the mini-runs.

4. A method as recited in claim 1, further comprising:
   selecting a particular record for output from a particular mini-run;
   in an event that the particular mini-run is not empty, replacing the selected particular record with a next record from the particular mini-run; and in an event that the particular mini-run is empty, deleting the leaf node associated with the particular mini-run.

5. One or more storage media storing computer-executable instructions for performing the method as recited in claim 1.

6. A method as recited in claim 1, further comprising the step of determining whether memory is full, wherein the batch output routine is initiated in response to a determination that the memory is full.

7. A method as recited in claim 1, wherein the batch of predefined size comprises a batch having a predetermined number of records.

8. A method as recited in claim 1, wherein the input routine includes the steps of reading, forming, and adding.

9. A method, comprising:

forming a selection tree in memory as an array of pointers to records to be sorted, the selection tree having external leaf nodes and internal nodes;

associating a set of multiple sorted data records with each of the external leaf nodes;

using key values of first records in the sets of sorted data records to define the internal nodes of the selection tree;

selecting a record for output from a particular external leaf node;

in an event that the set of multiple data records associated with the particular external leaf node is not empty, replacing the selected record with a next record from the set of multiple data records;

in an event that the particular set of multiple data records associated with the particular external leaf node is empty, deleting the particular external leaf node from the selection tree; and collecting multiple selected records in a batch of predefined size, and outputting the selected records in batch, wherein the selecting, collecting, and outputting steps are performed together as a batch output routine, and wherein the method further includes switching to an input routine following the outputting of the batch of selected records.

10. A method as recited in claim 9, further comprising creating the set of multiple sorted data records by reading in multiple records in batch and sorting the multiple records.

11. One or more storage media storing computer-executable instructions for performing the method as recited in claim 9.

12. A method as recited in claim 9, further comprising the step of determining whether memory is full, wherein the batch output routine is initiated in response to a determination that the memory is full.

13. A method as recited in claim 9, wherein the batch of predefined size comprises a batch having a predetermined number of records.

14. A method for constructing a selection tree used in replacement selection processes to form runs of data records, comprising:

associating a set of multiple sorted data records with each external leaf node of the selection tree stored in memory, each data record having a corresponding run number and key value;

using the key values of first records in the sets of sorted data records to define the internal nodes of the selection tree;

selecting multiple records for output from the sets of multiple data;

collecting the selected records into a batch of predefined size; and outputting the batch of selected records, wherein the selecting, collecting, and outputting steps are performed together as a batch output routine, and wherein the method further includes switching to an input routine following the outputting of the batch of selected records.

15. A method as recited in claim 14, wherein the associating comprises inserting first records from the sets of multiple data records in the -respective external leaf nodes and linking the first records to remaining records in the sets of multiple data records.

16. One or more storage media storing computer-executable instructions for performing the method as recited in claim 14.

17. A method as recited in claim 14, further comprising the step of determining whether memory is full, wherein the batch output routine is initiated in response to a determination that the memory is full.

18. A method as recited in claim 14, wherein the batch of predefined size comprises a batch having a predetermined number of records.

19. A method as recited in claim 14, further wherein the selection tree has a dynamically varying size.

20. In a database system having cache memory, main memory, and persistent data storage, a method for forming a run of sorted data records using a selection tree, comprising:

reading multiple records in batch from the persistent data storage into the main memory;

sorting the multiple records in the main memory to form a mini-run of sorted data records;

adding the mini-run as an external node on the selection tree, wherein a first record in the mini-run is represented by the external node;

selecting a record for output from a particular external node;

in an event that the mini-run at the particular external node is not empty, replacing the selected record with a next record from the mini-run;

in an event that the particular mini-run at the particular external node is empty, deleting the external node;

collecting the selected records in a batch of predefined size; and outputting the selected records in batch, wherein the selecting, collecting, and outputting steps are performed together as a batch output routine, and wherein the method further includes switching to an input routine following the outputting of the batch of selected records.

21. A method as recited in claim 20, wherein the reading and the sorting are performed concurrently with the selecting and the replacing or the deleting.

22. A method as recited in claim 20, wherein the collecting and the outputting are performed concurrently with the selecting and the replacing or the deleting.

23. One or more storage media storing computer-executable instructions for performing the method as recited in claim 20.

24. A method as recited in claim 20, further comprising the step of determining whether memory is full, wherein the batch output routine is initiated in response to a determination that the memory is full.

25. A method as recited in claim 20, wherein the batch of predefined size comprises a batch having a predetermined number of records.

26. A replacement selection method used in large scale sorting for forming runs of sorted data records, an improvement comprising forming external leaf nodes of a selection tree as mini-runs of multiple sorted data records, further improved by batch processing of input and output records, wherein the batch processing of input records is performed in a batch input routine, and the batch processing of output records is performed in a batch output routine, wherein the batch input routine alternates with the batch output routine.

27. A system comprising:
a memory subsystem having a persistent data storage and a main memory;
a processing unit having a processor and cache memory;
a batched replacement selection module executed by the processing unit for forming runs of sorted data records, the batched replacement selection module forming a selection tree as an array of pointers to records to be sorted, the array being stored in the main memory; and
the batched replacement selection module reading multiple records in batch from the persistent data storage into the main memory and sorting the multiple records in the main memory to form a mini-run of sorted data records, the batched replacement selection module adding the mini-run as an external node on the selection tree,
wherein the batched replacement selection module selects multiple records for output, collects the selected records in a batch of predefined size, and writes the selected records in batch back to the persistent data storage,
wherein the selecting, collecting, and writing are performed together as a batch output routine, and wherein the method further includes switching to an input routine following the outputting of the batch of selected records.

28. A system as recited in claim 27, wherein the batched replacement selection module selects a particular record for output from a particular external node in the selection tree and in an event that the mini-run at the particular external node is not empty, replaces the selected particular record with a next record from the mini-run.

29. A system as recited in claim 27, wherein the batched replacement selection module selects a particular record for output from a particular external node in the selection tree and in an event that the particular mini-run at the particular external node is empty, deletes the external node.

30. A system as recited in claim 27, wherein the batch output routine is initiated in response to a determination that the memory is full.

31. A system as recited in claim 27, wherein the batch of predefined size comprises a batch having a predetermined number of records.

32. A system as recited in claim 27, further wherein the selection tree has a dynamically varying size.

33. A system comprising:
a memory subsystem having a persistent data storage and a main memory;
a processing unit having a processor and cache memory;
an array of pointers to records to be sorted arranged to form a selection tree having internal and external nodes, the array being stored in the main memory;
a mini-run assembly data structure stored in the main memory; and
a batched replacement selection module executable on the processing unit to read multiple records from the persistent data storage into the mini-run assembly data structure and sort the multiple records to form a mini-run of sorted data records, the batched replacement selection module inserting a pointer to a first record in the mini-run into the array of pointers to add a node to the selection tree, the first record being linked to remaining records in the mini-run,
wherein the batched replacement selection module selects a record for output, collects the selected records in a batch of predefined size, and writes the selected records in batch back to the persistent data storage,
wherein the selecting, collecting, and writing are performed together as a batch output routine, and wherein the method further includes switching to an input routine following the outputting of the batch of selected records.

34. A system as recited in claim 33, wherein the batched replacement selection module selects a particular record for output from a particular node in the selection tree and in an event that the mini-run associated with the node is not empty, replaces the particular selected record with a next record from the mini-run.

35. A system as recited in claim 33, wherein the batched replacement selection module selects a particular record for output from a particular node in the selection tree and in an event that the mini-run associated with the particular node is empty, deletes the node.

36. A system as recited in claim 33, wherein the batch output routine is initiated in response to a determination that the memory is full.

37. A system as recited in claim 33, wherein the batch of predefined size comprises a batch having a predetermined number of records.

38. A system as recited in claim 33, further wherein the selection tree has a dynamically varying size.

39. A program module stored on a computer readable medium that, when executed by a processor, performs:
reading multiple records into a data structure in memory;
sorting the multiple records to form a mini-run of sorted data records;
adding the mini-run as an external node on a selection tree;
selecting multiple records for output from the mini-runs;
collecting the selected records in a batch of predefined size; and
outputting the selected records in batch,
wherein the selecting, collecting, and outputting steps are performed together as a batch output routine, and wherein the method further includes switching to an input routine following the outputting of the batch of selected records.

40. A program module as recited in claim 39, further performing:

selecting a particular record for output from a particular external node of the selection tree; and in an event that the mini-run at the particular external node is not empty, replacing the selected particular record with a next record from the mini-run.

41. A program module as recited in claim 39, further performing:

selecting a particular record for output from a particular external node of the selection tree; and in an event that the particular mini-run at the particular external node is empty, deleting the external node.

42. A program module as recited in claim 39, wherein the batch output routine is initiated in response to a determination that the memory is full.

43. A program module as recited in claim 39, wherein the batch of predefined size comprises a batch having a predetermined number of records.

44. A program module as recited in claim 39, further wherein the selection tree has a dynamically varying size.

* * * * *

UNITED STATES PATENT AND TRADEMARK OFFICE
CERTIFICATE OF CORRECTION

PATENT NO.    : 6,571,244 B1
DATED         : May 27, 2003
INVENTOR(S)   : Larson It is certified that error appears in the above-identified patent and that said Letters Patent is hereby corrected as shown below:

Column 5,
Line 45, delete "is" between "90%" and "or".

Column 11,
Lines 29 and 50, replace "fill" with -- full --.

Signed and Sealed this

Fourteenth Day of October, 2003

JAMES E. ROGAN
*Director of the United States Patent and Trademark Office*